United States Patent
Dhanabalan et al.

(10) Patent No.: US 10,404,603 B2
(45) Date of Patent: Sep. 3, 2019

(54) SYSTEM AND METHOD OF PROVIDING INCREASED DATA OPTIMIZATION BASED ON TRAFFIC PRIORITY ON CONNECTION

(71) Applicant: Citrix Systems, Inc., Fort Lauderdale, FL (US)

(72) Inventors: Praveen Raja Dhanabalan, Bangalore (IN); Chaitra Maraliga Ramaiah, Bangalore (IN); Karthick Srivatsan, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 177 days.

(21) Appl. No.: 15/004,677

(22) Filed: Jan. 22, 2016

(65) Prior Publication Data

US 2017/0214625 A1    Jul. 27, 2017

(51) Int. Cl.
*H04L 12/851*    (2013.01)
*H04L 12/801*    (2013.01)

(52) U.S. Cl.
CPC .......... *H04L 47/2433* (2013.01); *H04L 47/12* (2013.01)

(58) Field of Classification Search
CPC ...................... H04L 47/2433; H04L 1/1835
See application file for complete search history.

(56) References Cited

U.S. PATENT DOCUMENTS

| | | | | |
|---|---|---|---|---|
| 2003/0005230 A1* | 1/2003 | Solomon | ............. | G06F 12/0886 711/128 |
| 2006/0143396 A1* | 6/2006 | Cabot | .................... | G06F 12/121 711/134 |
| 2007/0041390 A1* | 2/2007 | Tatar | ....................... | H04L 47/10 370/412 |
| 2013/0077486 A1* | 3/2013 | Keith | .................. | H04L 47/2433 370/230.1 |
| 2017/0091108 A1* | 3/2017 | Arellano | ............. | G06F 12/0888 |

* cited by examiner

*Primary Examiner* — Un C Cho
*Assistant Examiner* — Lalita W Pace
(74) *Attorney, Agent, or Firm* — Allen, Dyer, Doppelt + Gilchrist PA

(57) ABSTRACT

An appliance o for evicting data based on traffic priority of data is described. The appliance has one or more processors and includes a compression history manager configured to acquire traffic priority information of data, the data being conveyed over a connection and to assign a compression history set based on the traffic priority information of the data. The compression history manager is also configured to, if cache space does not exist to store the data and another compression history set corresponds to lower traffic priority in a cache queue, evict data from the other compression history set corresponding to lower traffic priority.

24 Claims, 11 Drawing Sheets

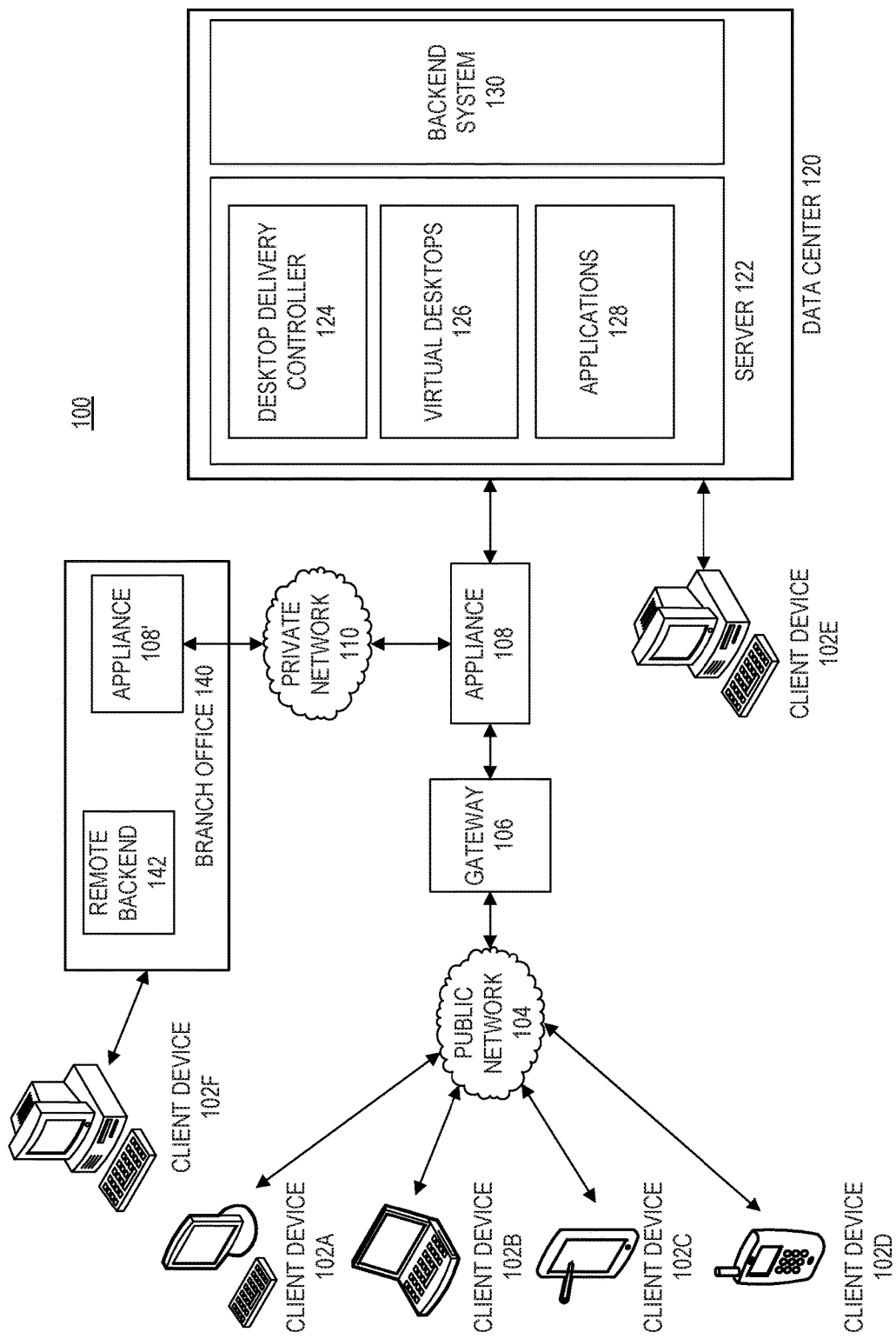

| CONNECTION 910 | DATA 920 | TRAFFIC PRIORITY OF THE DATA 930 | COMPRESSION HISTORY 940 |
|---|---|---|---|
| C1 911 | D-1 921 | P1 931 | Set-A 941 |
| | D-2 922 | P1 932 | |
| | D-3 923 | P2 933 | Set-B 942 |
| C2 912 | D-4 924 | P3 934 | Set-C 943 |
| C3 913 | D-5 925 | P1 935 | Set-A 944 |

NEW CONNECTION

SYSTEM AND METHOD OF PROVIDING INCREASED DATA OPTIMIZATION BASED ON TRAFFIC PRIORITY ON CONNECTION

BACKGROUND

A middlebox is a network appliance that manipulates Internet traffic by optimizing data flow across the network. Middleboxes can be configured as wide area network (WAN) optimizers and can be deployed in pairs across two geographically separated locations to optimize data traffic between the two middleboxes. Middleboxes can proxy the transmission control protocol (TCP) connections by monitoring the TCP connections on a first link (local area network (LAN)) and forming a new TCP connection (a proxied TCP connection) on second link (WAN) based on the connection on the first link. Middleboxes can be connected through a single link or multiple links such as a leased line link and a broadband link.

A middlebox can provide data optimization for the TCP connections between two middleboxes, for example, one appliance in branch office and the other appliance in data center. These appliances compress data traffic in WAN link, by a data compression technique called data deduplication. Deduplication is an optimization technique used to improve storage utilization and can also be applied to network data transfers to reduce the number of bytes that must be sent.

Cache techniques are also used to improve storage utilization. Eviction is an integral part of cache data handling. If a connection request arrives and if it needs space for its unique data to be stored, then some caching techniques can be employed for considering the data to be evicted. There are various cache techniques including last recently used (LRU), most recently used (MRU), and Pseudo-LRU techniques. For the LRU algorithm, the least recently used items are discarded first. This algorithm requires keeping track of what was used when, which is expensive if one wants to make sure the algorithm always discards the least recently used item. General implementations of this technique require keeping "age bits" for cache-lines and track the "Least Recently Used" cache-line based on age-bits. In such an implementation, every time a cache-line is used, the age of all other cache-lines changes. For the MRU algorithm, in contrast to the LRU algorithm, the most recently used items are discarded first. MRU algorithm is most useful in situations where the older an item is, the more likely it is to be accessed. For the pseudo-LRU algorithm, one of the least recently used items is discarded. As an example, for CPU caches with large associativity (generally >4 ways), implementation cost of LRU becomes prohibitive. In many CPU caches, a scheme that almost always discards one of the least recently used items is sufficient. So many CPU designers choose a PLRU algorithm which only needs one bit per cache item to work. p-LRU typically has a slightly worse miss ratio, has a slightly better latency, and uses slightly less power than LRU.

Data can be served for different kinds of applications. Each application can have a different priority. For example, web-browsing data can be handled as best effort service and thus lowest priority, while video data can be handled in highest priority. In another example, low-quality video streams often consume several hundred kilobits per second, while high definition video can require up to several megabits per second of bandwidth. As a result, even one stream of low quality video can consume a large percentage of WAN bandwidth available to a branch office. Left unmanaged, this can cause a diminished experience for other branch users simultaneously attempting to connect to their virtual desktops or other resources hosted in datacenter (e.g., Microsoft Exchange or file servers). The problem occurs when there is an overwhelming rate of low or medium priority data coming to a cache that has limited space, the cache's space can often become full. Under current technologies, a compression history eviction happens on plain cache hit information and irrespective of priority data is evicted.

SUMMARY

In some aspects, an appliance for evicting data based on traffic priority of data is described. The appliance has one or more processors and includes a compression history manager configured to acquire traffic priority information of data, the data being conveyed over a connection and to assign a compression history set based on the traffic priority information of the data. The compression history manager is also configured to, if cache space does not exist to store the data and another compression history set corresponds to lower traffic priority in a cache queue, evict data from the other compression history set corresponding to lower traffic priority.

In another aspect, a method of evicting data based on traffic priority of data is described. The method can include acquiring traffic priority information of data, the data being conveyed over a connection, assigning a compression history set based on the traffic priority information of the data, and, if cache space does not exist to store the data and another compression history set corresponds to lower traffic priority in a cache queue, evicting data from the other compression history set corresponding to lower traffic priority.

In yet another aspect, non-transitory computer readable storage medium is described. The storage medium stores a set of instructions that are executable by at least one processor of an appliance to cause the appliance to perform a method of evicting data based on traffic priority of data. The method can include acquiring traffic priority information of data, the data being conveyed over a connection, assigning a compression history set based on the traffic priority information of the data, and, if cache space does not exist to store the data and another compression history set corresponds to lower traffic priority in a cache queue, evicting data from the other compression history set corresponding to lower traffic priority.

BRIEF DESCRIPTION OF THE DRAWINGS

Reference will now be made to the accompanying drawings showing example embodiments of this disclosure. In the drawings:

FIG. 1 is a block diagram of an exemplary network environment, consistent with embodiments of the present disclosure.

DETAILED DESCRIPTION

Figure 2A:
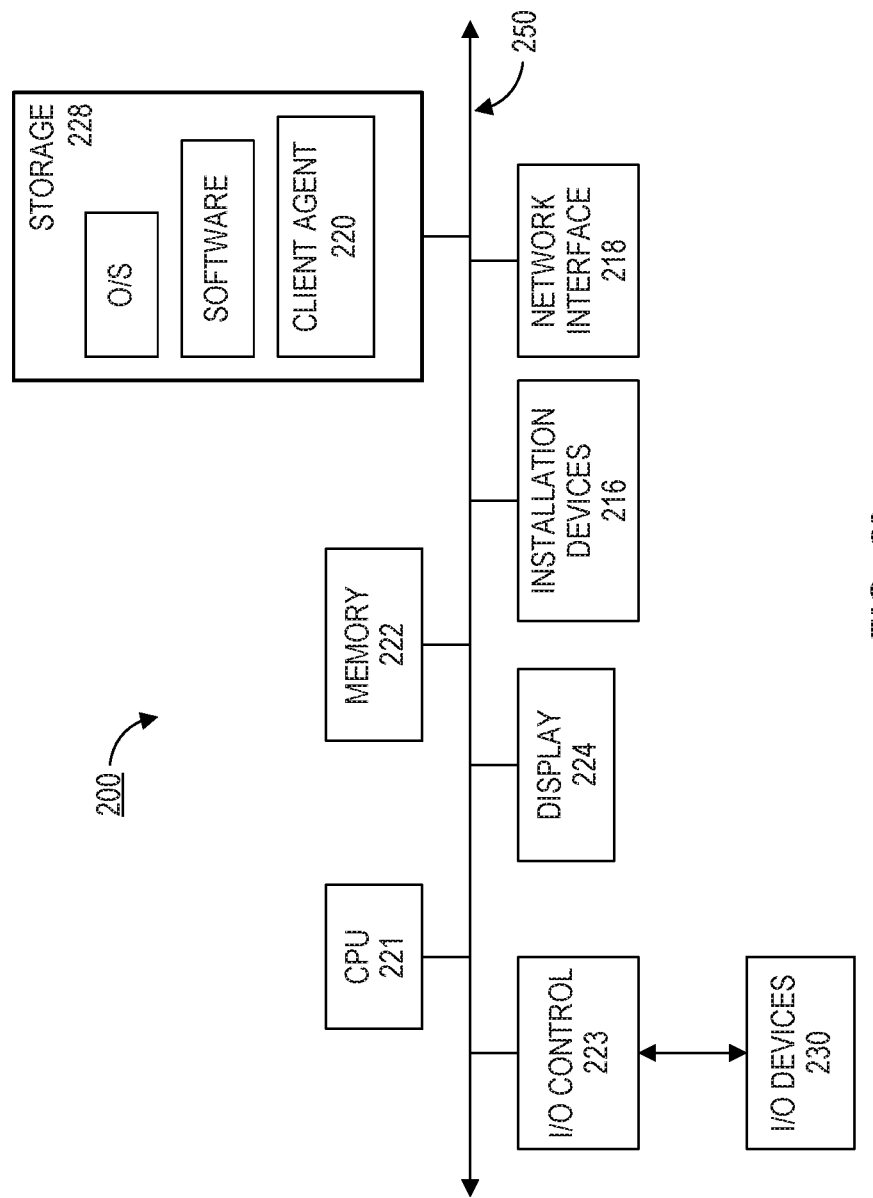
FIGS. 2A-2B are block diagrams of an exemplary computing device, consistent with embodiments of the present disclosure.

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide increased data optimization based on traffic priority on connection. This can be achieved by determining eviction of compression history based on traffic priority of connection, and thus retaining compression history for high priority traffic for a longer duration. This is based on an expectation that a set of connections that fall in a traffic priority class of application having the same priority will have better pattern matching of data compared to another traffic priority class of application. The present disclosure provides advantages as followings: high priority traffic gets high compression benefits, and thus optimized data can be transferred over WAN, compared to other lower priority traffic. Also, the present disclosure provides intelligent management of compression history of high priority connections, even if an overwhelming rate of incoming low or medium priority connections comes.

The present disclosure allows a system to maintain higher benefits for higher priority connections by associating LRU with traffic priority for eviction. Thus, lower or medium priority connections don't suffer complete eviction because the methods in the present disclosure perform a pseudo proportional eviction, allowing at least some amount of lower or medium connection data to be preserved for benefits to some extent, unless eviction of complete data is appropriate from a computational perspective.

The embodiments of the present disclosure can provide better QoS for data in high traffic priority by extending beyond plain priority-based packet delivery, by associating it with an algorithm of compression history eviction. The embodiments of the present disclosure can provide higher compression benefits for the higher priority connections, based on QOS Traffic priority, and thereby optimize data over WAN, even when there is a very high incoming rate of medium and low priority connections in the enterprise passing via the WAN optimizers.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with a data center 120 either directly (e.g., client device 102e) or indirectly through a public network 104 (e.g., client devices 102a-d) or a private network 110 (e.g., client device 102f). When client device 102 communicates through public network 104 or private network 110, a communication link can be established. For example, a link can be established by public network 104, gateway 106, and appliance 108, thereby providing a client device (e.g. client devices 102a-d) access to data center 120. A link can also be established by branch office 140 including appliance 108', private network 110, and appliance 108, thereby providing a client device (e.g. client device 102f) access to data center 120. While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device (e.g., wearable or smart watch) that communicates packets to and from data center 120.

Public network 104 and private network 110 can be any type of network such as a WAN, a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes WAN traffic by including, for example, a quality of service ("QoS") engine. In some embodiments, appliance 108 optimizes other types of network traffic, such as LAN traffic, MAN traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or Cloud-Bridge™. In some embodiments, appliance 108 can be a virtual appliance. In some embodiments, appliance can be a physical device having multiple instances of virtual machines (e.g., virtual Branch Repeater).

In some embodiments, Appliances 108 can regulate or meter flow of data packets onto WAN link. Appliances 108 can impose transparent, lossless flow control on each segment of a connection: a LAN segment between one or more client devices 102 and appliance 108' in branch office 140, and a WAN segment between appliance 108' in branch office 140 and appliance 108 at data center 120, another LAN segment between appliance 108 at data center 120 and a public server. Appliances 108 can independently manage flow control and utilization for each segment independently by splitting a connection into three segments. This is important when a connection's speed needs to be ramped up or down to its fair bandwidth share and to ensure maximum advantage is taken of enhanced WAN optimization and compression algorithms.

Appliance 108 can analyze the traffic priority information of the data, associate the data of the connection with traffic priority, and provide the traffic priority information of the data. Appliance 108 can acquire traffic priority information of data. Appliance 108 can assign a compression history set based on the traffic priority information of the data. If cache space does not exist to store the data and another compression history set corresponds to lower traffic priority in a cache queue, Appliance 108 can evict data from the other compression history set corresponding to lower traffic priority. Appliance 108 can also evict a pseudo proportional amount of data across each traffic priority in the compression history set and the other compression history set. The compression history set can include the traffic priority information of data conveyed over the connection and a pointer that is directed to a stored location of the data. Appliance 108 can store, in a memory, the compression history set based on the traffic priority information of the data. Appliance 108 can, if cache space exists to store the data, store the data and the assigned compression history set. Appliance 108 can create a pointer that is directed to a stored location of the data.

When receiving a connection request asking data, appliance 108 can determine if the requested data exists in a memory, and provide the data or a pointer that is directed to a stored location of the data, based on determination that the data exists in the memory. Appliance 108 can analyze the requested data asked for in the connection request against a corresponding compression history set associated with the traffic priority information of the data. Appliance 108 can search the memory with a function of the traffic priority information of the data and LRU information.

Appliances 108 can maintain a compression history that is shared across connections. This means that data sent earlier by one connection can be used later to optimize traffic flowing over another connection. In some embodiments, smaller data streams seen frequently can be stored in memory for low-latency access. Larger data streams, such as bulk file transfers, can be stored on disk. This large-history, multi-session compression technology erases the distinction between compressible and un-compressible data. For example, a JPEG image is normally considered un-compressible. However, when sent multiple times, the entire image can be replaced by a pointer to the data already in the receiving appliance's compression history, resulting in significant bandwidth savings. In addition, appliance 108 can reference entire file objects. By leveraging pattern matching down to the block and byte level, it can also remove redundant data transmitted across different files and applications.

In some embodiments, a first appliance (e.g., appliance 108) works in conjunction with or cooperation with a second appliance (e.g., appliance 108') to optimize network traffic. For example, the first appliance can be located between WAN and a corporate LAN (e.g., data center 120), while the second appliance can be located between a branch office (e.g., branch office 140) and a WAN connection.

In some embodiments, the functionality of gateway 106 and appliance 108 can be located in a single physical device. Appliances 108 and 108' can be functionally the same or similar. Moreover, in some embodiments, appliance 108 and gateway 106 can be part of the same device. Appliance 108 is further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Microsoft Windows™-based applications and computing resources.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of LAN that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102f can be located on-site to branch office 140 or can be located remotely from branch office 140.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2B:
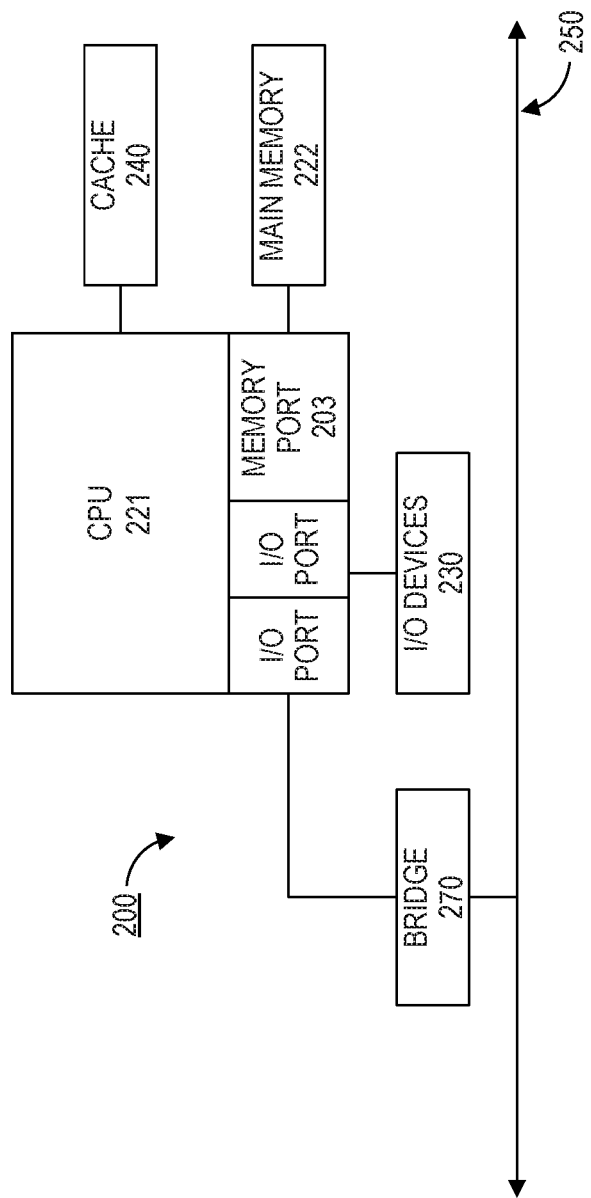

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
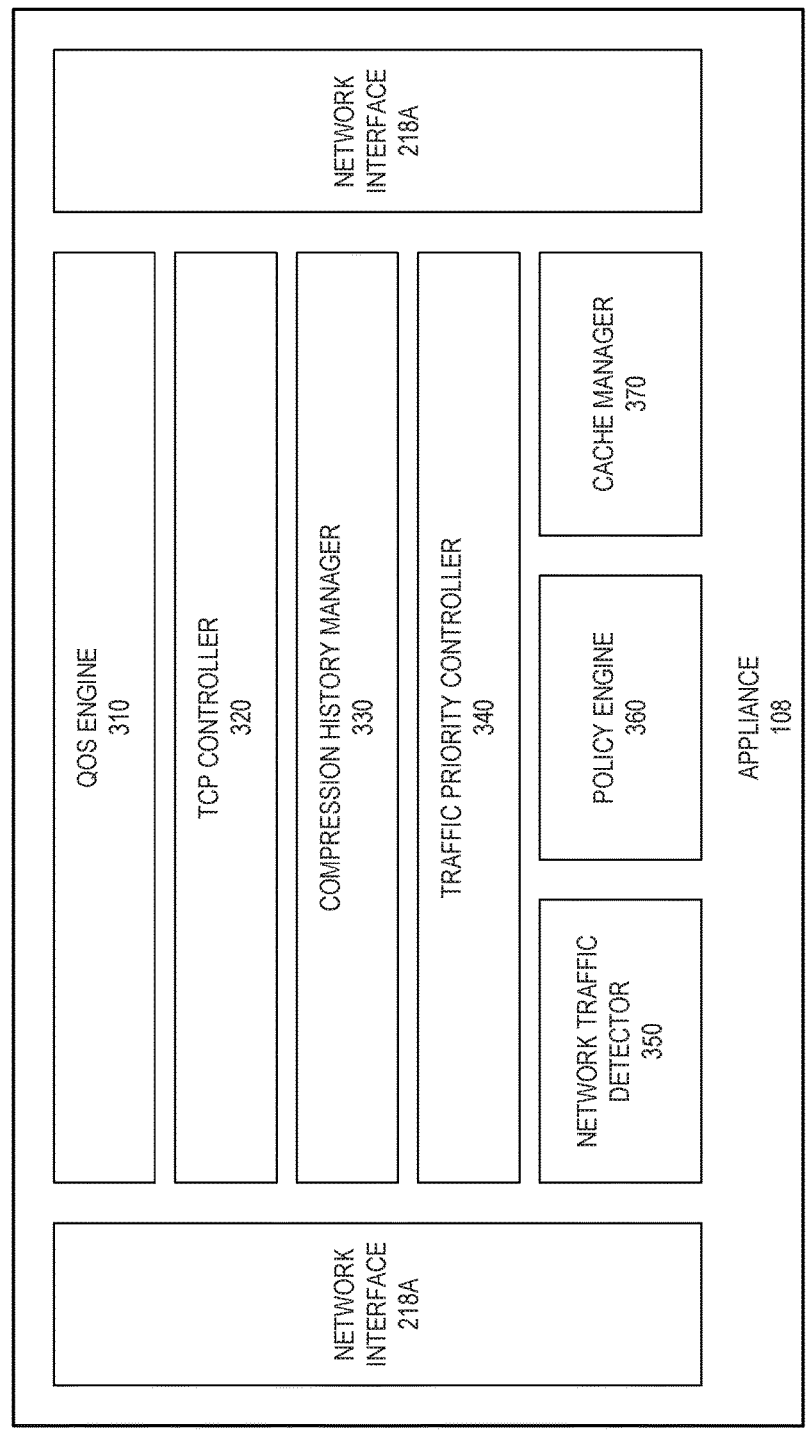
FIG. 3A is a block diagram of an exemplary appliance illustrated in FIG. 1, consistent with embodiments of the present disclosure.

FIG. 3A is a block diagram of an exemplary appliance 108 and/or 108' illustrated in FIG. 1, consistent with embodiments of the present disclosure. Appliance 108 can include one or more network interfaces 218A-N consistent with network interface 218 of FIG. 2A, a QoS engine 310, a TCP controller 320, a compression history manager 330, a traffic priority controller 340, a network traffic detector 350, a policy engine 360, and a cache manager 370. Although FIG. 3A depicts network interfaces 218A-218N as two network interfaces, it is appreciated that interfaces 218A-218N can include any number of network interfaces.

QoS engine 310, which is also referred to as a "QoS controller," or a "QoS packet scheduler," can perform one or more QoS optimization techniques, including the application of one or more TCP traffic prioritization algorithms, etc. QoS engine 310 can be one or more modules, which can be one or more packaged functional software and/or hardware units designed for use with other components or a part of a program that performs a particular function (e.g., optimization techniques), corresponding to the particular step of related functions. QoS engine 310 can be configured to improve the performance, operation, or quality of service of any type of network traffic. QoS engine 310 performs these techniques, for example, by using defined logic, business rules, functions, or operations. In some embodiments, QoS engine 310 can perform network traffic optimization and management mechanisms that provide different priorities to different users, applications, flows, or links. QoS engine 310 can also control, maintain, or assure a certain level of performance to a user, application, flow, or connection. QoS engine 310 can direct TCP controller 320 to perform any or all steps for determining one or more congestion windows using one or more TCP characteristics and TCP traffic priority. For example, QoS engine 310 can control, maintain, prioritize and/or assure a certain portion of bandwidth or network capacity of a communication link for a user, application, one or more flows, or links, collect data in connection with one or more flows and links, analyze the collected data, select a TCP flavor suitable for avoiding TCP traffic congestion on the one or more flows. QoS engine 310 can observe traffic behaviors and user behaviors, and based on the traffic and user behaviors, determine relative priorities of traffic.

In some embodiments, QoS engine 310 can monitor the achieved level of performance or the quality of service (e.g., the data rate, delay, dropped packets, etc.) corresponding to a user, application, and/or flow, or link, and then dynamically control or adjust one or more TCP characteristics in connection with sending and receiving data packets to achieve the desired level of performance or quality of service. QoS engine 310 can coordinate the acquisition and delivery of TCP characteristics between traffic priority controller 340 and TCP controller 320. QoS engine 310 can also coordinate the acquisition and delivery of link characteristics between components of appliance 108, such as, for example, between network traffic detector 350, TCP controller 320, and traffic priority controller 340. QoS engine 310 can direct compression history manager 330 to perform some or all of the steps according to exemplary embodiments disclosed herein. For example, QoS engine 310 can analyze traffic priority information of data conveyed over each connection. QoS engine 310 can associate the data of the connection with traffic priority. QoS engine 310 can provide compression history manager 330 with the traffic priority information of the data.

TCP controller 320, which is also referred to as a "packet engine," a "packet processor," or a "data processor," is responsible for controlling and managing the processing of data packets received and transmitted by appliance 108 via network interfaces 218A-N. TCP controller 320 can be one or more modules, which can be one or more packaged functional hardware units designed for use with other components or a part of a program that performs a particular function (e.g., controlling and managing the processing of data packets), corresponding to the particular step of related functions. TCP controller 320 can be embodied as a single packet engine or any number of a plurality of packet engines that can operate at the data link layer (layer 2), network layer (layer 3), or the transport layer (layer 4) of a network stack (e.g., such as the layers and protocols of the Open System Interconnection communications model). TCP controller 320 can be configured to accomplish some or all of the steps described herein after being executed by CPU 221 and/or QoS engine 310. In some aspects, the data packets can be carried over the data link layer via the Ethernet communication protocol, which can comprise any of the family of WAN or LAN protocols, such as those protocols covered by the IEEE 802.3. In other aspects, the network stack can have any type and form of wireless protocols, such as IEEE 802.11 and/or mobile internet protocols. In some embodiments, TCP controller 320 intercepts or receives data packets at the network layer, such as via the IP communication protocol. In some embodiments, TCP controller 320 can intercept or receive data packets at the transport layer, such as via the TCP communication protocols. TCP controller 320 can operate at any session or any application layer above the transport layer.

TCP controller 320 can include a buffer for queuing one or more data packets during processing of the data packets. Additionally, TCP controller 320 can communicate via one or more communication protocols to transmit and receive a plurality of network data packets across one or more links via network interfaces 218A-N. The links can connect appliance 108 to appliance 108'. TCP controller 320 can be configured to acquire data regarding the flow and store, the acquired data in an operatively connected computer memory (e.g., compression history database). The sent and received data packets operating across one or more links can be considered "data flows" or "flows." In some embodiments, TCP controller 320 can send scheduling requests to QoS engine 310 for scheduling of data packets received and stored at TCP controller 320 or an operatively connected computer memory (e.g., compression history database). After TCP controller 320 receives responses from QoS engine 310 or compression history manager 330, TCP controller 320 processes the stored data packets according to their scheduled priorities determined by QoS engine 310, and/or traffic priority controller 340. TCP controller 320 can determine one or more TCP characteristics of the flow based on the stored data. A TCP characteristic, as discussed in further detail below, includes a plurality of information such as, for example, packet round trip times and/or the packet loss rate for a particular data flow, an average bandwidth delay product for the packets sent and received across a particular link, congestion window drop information, and/or other congestion window information such as current congestion window size, among other things.

During operations of appliance 108, TCP controller 320 can interface, be integrated with, or be in communication with any portion of appliance 108, such as QoS engine 310, traffic priority controller 340, network traffic detector 350, policy engine 360, and/or cache manager 370. As such, any of the logic, functions, or operations of QoS engine 310, traffic priority controller 340, network traffic detector 350, policy engine 360, and/or cache manager 370 can be performed in conjunction with or in responsive to TCP controller 320. TCP controller 320 can be controlled by and/or execute any operation described herein.

Compression history manager 330 can acquire traffic priority information of data. Compression history manager 330 can assign a compression history set based on the traffic priority information of the data. If cache space does not exist to store the data and another compression history set corresponds to lower traffic priority in a cache queue, compression history manager 330 can evict data from the other compression history set corresponding to lower traffic priority. The compression history set can include the traffic priority information of data conveyed over the connection and a pointer that is directed to a stored location of the data compression history manager 330 can store, in a memory, the compression history set based on the traffic priority information of the data compression history manager 330 can, if cache space exists to store the data, store the data and the assigned compression history set. Appliance 108 can create a pointer that is directed to a stored location of the data.

After receiving a connection request asking data, compression history manager 330 can determine if the requested data exists in a memory, and provide the data or a pointer that is directed to a stored location of the data, based on determination that the data exists in the memory. Appliance 108 can analyze the requested data against a corresponding compression history set associated with the traffic priority information of the data.

Compression history manager 330 can determine whether the incoming connection needs to store new data that has not been already present in a memory, e.g., compression history database. Compression history manager 330 can look for traffic priority of the incoming connection. This traffic priority information is being dynamically updated into compression history manager 330 as a part of feedback from QoS engine 310 for every incoming connection. Compression history manager 330 can create linking of the connection's traffic priority with its respective compression history set and put the data to an appropriate set.

In some embodiments, if a connection request asks for data already present in the memory, e.g., compression history database, compression history manager 330 can analyze the data against its compression history and then to search the database with a function of traffic priority and LRU, e.g., Fn (Priority+LRU), for the existence of the data being requested for. Based on the traffic priority, compression history manager 330 can scan the data in a particular priority set and apply LRU locally. When compression history manager 330 finds traffic priority of the data higher across different compression history sets, then compression history manager 330 can move the data to a new compression history set.

In some embodiments, compression history manager 330 can determine evicting a pseudo proportional amount of data across each traffic priority in their respective compression history sets, thereby mitigating the possibility of complete eviction of high priority data. For example, it is assumed that a memory, e.g., compression history database, is full and an eviction will need to occur for new data to be added. There can be five traffic priority levels, e.g., P1-P5 with P1 being the highest priority and P5 being the lowest priority. Some data can be classified as P1 and other data can be classified as P2, P3, P4, and P5. Compression history manager 330 can determine evicting 5 units of P5, 4 units of P4, 3 units of P3, 2 units of P2 and 1 units of P1 in a round robin fashion. The unit can be in bytes. Compression history manager 330 can then evict a pseudo proportional amount of data across each traffic priority in the compression history set and the other compression history set. Alternatively, compression history manager 330 can provide the eviction determination to TCP controller 320 to allow TCP controller 320 to perform eviction of the determined data. In present inventions, evicting data can include evicting data performed by compression history manger 330, or providing an instruction to evict data by compression history manager 330 to TCP controller 320 so that TCP controller 320 can perform evicting data based on the instruction.

In some aspects, one or more traffic priority controllers 340 can be configured to send and receive flow information from TCP controller 320, and/or QoS engine 310. Traffic priority controller 340 can be one or more modules and be configured to acquire one or more TCP characteristics from TCP controller 320, acquire one or more flow priorities from traffic priority controller 340, and determine a congestion window size based on the TCP characteristics and the one or more flow priorities. Because the flow characteristics change with time during the high priority (first priority) congestion window determination process, the selection is said to be dynamic. TCP characteristics can include one or more characteristics that change with time, such as, for example, packet round trip times and/or the packet loss rate for a particular data flow, an average queuing delay for the packets sent and received across a particular link, and/or congestion window information.

In some aspects, traffic priority controller 340 can determine one or more relative priorities for each TCP flow. Traffic priority controller 340 works in conjunction with QoS engine 310 to observe relative priorities of TCP flows, and assign new TCP priorities based on observed behavior and/or predetermined priority rules.

One or more network traffic detectors 350 can include any logic, business rules, functions, or operations for automatically detecting the type of network traffic corresponding to data packets acquired by TCP controller 320. Network traffic detector 350 can be one or more modules. As described above, TCP controller 320 can store and transmit data packets from any type of network traffic, such as data packets from any communication protocols including WAN, MAN, LAN, and wireless communication protocols. In some embodiments, not all network traffic is optimized by QoS engine 310. For example, QoS engine 310 can be used to optimize the WAN traffic, but not the LAN traffic or traffic directed to management. Network traffic detector 350 can detect the type of network traffic received at TCP controller 320 by any available techniques, such as by using IP addresses. Network traffic detectors 350 can also determine a link type, a bandwidth, and/or other characteristics associated with one or more flows.

Appliance 108 can also include a policy engine 360, also referred to as a policy controller or a policy provider. Policy engine 360 can be one or more modules and can include any logic, function, or operations for providing and applying one or more policies or rules to the function, operation, or configuration of any portion of the appliance 108. In some embodiments, policy engine 360 provides a configuration mechanism to allow a user to identify, specify, define, or configure a policy for appliance 108, or any portion thereof. For example, policy engine 360 can provide a predefined traffic optimization configuration policy including the number of priorities, the priorities associated with each service class, the number of connections allowed under each service class, link bandwidth configuration, and any other policy information. Policy engine 360 can also provide policies for what data to cache, when to cache the data, for whom to cache the data, when to expire an object in cache, or when to refresh the cache. Policy engine 360 can also include any logic, rules, functions, or operations for determining and providing access, control, and management of data packets received and stored by TCP controller 320. Policy engine 360 can also include any logic, rules, functions, or operations for determining and providing access, control and management of security, network traffic, network access, compression, or any other function or operation performed by appliance 108.

Cache manager 370 is one or more modules configured to store data, information, and objects to a cache in memory or storage; to provide cache access; and to control and manage the cache. The data, objects, or content processed and stored by cache manager 370 can include data in any format, such as a six-byte MAC address, a TCP data packet, or any type of data communicated via any communication protocol. Examples of types of data can include, for example, one or more priority information of data in any incoming connection request. Examples of types of data can also include, for example, one or more priority information of a connection conveying data. Examples of types of data can also include, for example, one or more TCP characteristics including information in connection with packet loss rates, queuing delays, flow congestion, sizes of congestion windows, bandwidth of one or more links, average round trip times, etc. Cache manager 370 can rearrange compression history set information based on priority information of a connection in a cache queue. When determining to rearrange compression history set information, cache manager 370 can also use least recently used (LRU) information. Cache manager 370 can save data and/or a link which points to a stored location of the data in a fast-access cache memory, such as cache 240. In some embodiments, cache manager 370 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of appliance 108. In some embodiments, the cache can comprise any type and form of storage element of appliance 108, such as a portion of a hard disk. In some embodiments, as described above, the processing unit of the device, such as CPU 221, can provide cache memory for use by cache manager 350. Cache manager 370 can use any portion and combination of main memory 222, storage 228, or CPU 221 for caching data, objects, and other content.

Cache manager 370 can comprise any type of general purpose processor (GPP), or any other type of integrated circuit, such as a Field Programmable Gate Array (FPGA), Programmable Logic Device (PLD), or Application Specific Integrated Circuit (ASIC).

Figure 3B:
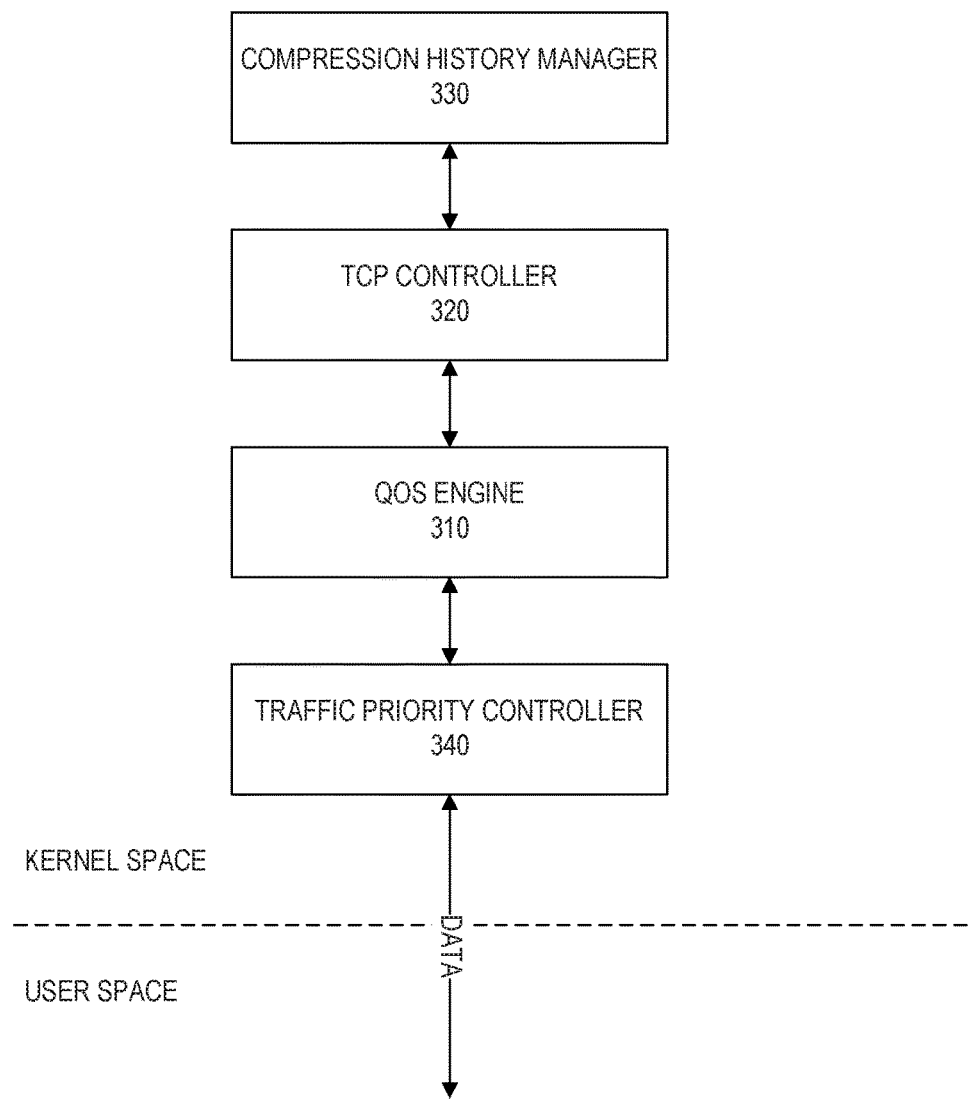
FIG. 3B is a block diagram of a portion of an exemplary appliance illustrated in FIG. 3A, consistent with embodiments of the present disclosure.

FIG. 3B is a block diagram of a portion of exemplary appliance 108 illustrated in FIG. 3A, consistent with embodiments of the present disclosure. In some embodiments, the operating system of appliance 108 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 108. In some aspects, the kernel space can also include a number of network services or processes working in conjunction with QoS engine 310, TCP controller 320, compression history manager 330, traffic priority controller 340, or any portion thereof. Additionally, the embodiments of the kernel can depend on the operating system installed, configured, or otherwise used by appliance 108.

User space is memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

Figure 4:
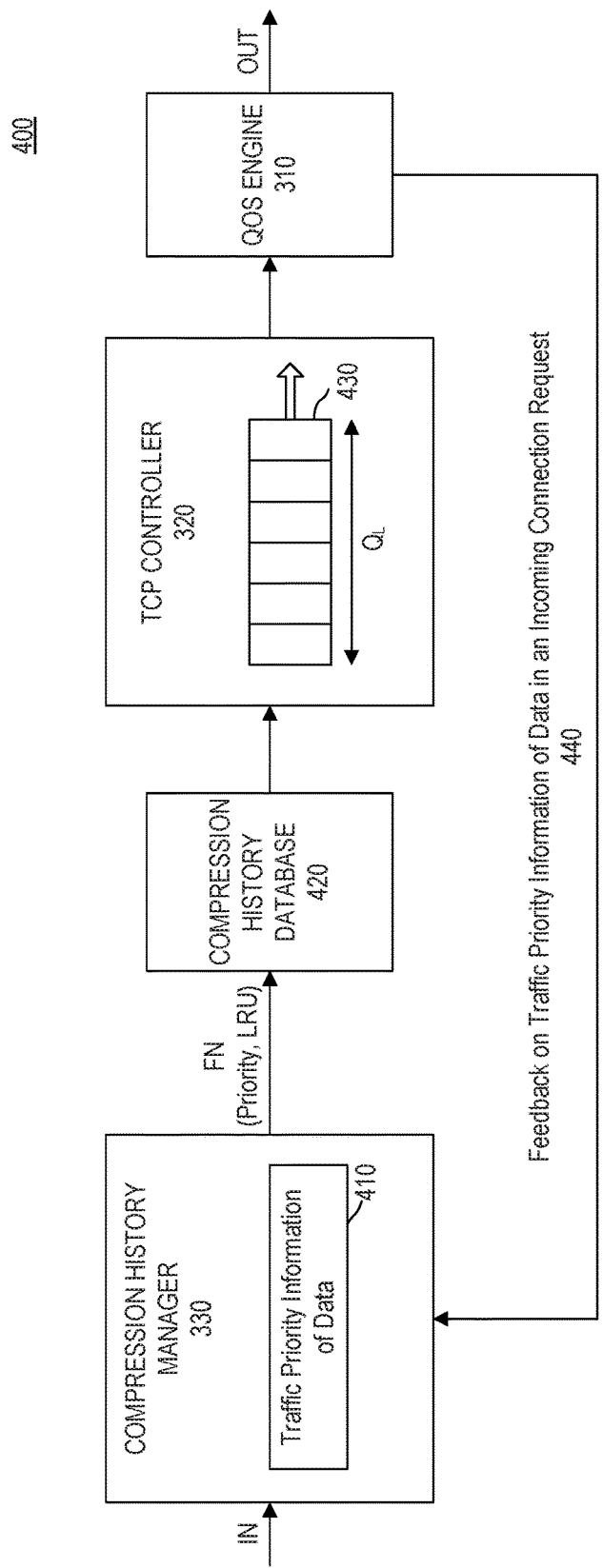
FIG. 4 is a block diagram of an exemplary embodiment of determining eviction of data in a compression history set based on traffic priority, consistent with embodiments of the present disclosure.

FIG. 4 is a block diagram of an exemplary embodiment of determining eviction of data in a compression history set based on traffic priority, consistent with embodiments of the present disclosure.

After receiving an incoming connection request, compression history manager 330 can be configured to determine whether the incoming connection needs to store new data that has not been already present in a memory, e.g., compression history database. Then, compression history manager 330 can be configured to look for traffic priority information of data 410 for the incoming connection. This traffic priority information of data 410 can be dynamically updated into compression history manager 330 as a part of feedback from QoS engine 310 for every incoming connection. Compression history manager 330 can be configured to create linking of the connection's traffic priority with its respective compression history set and put the data to an appropriate set.

In some embodiments, if a connection request asks for data already present in the memory, e.g., compression history database, compression history manager 330 is configured to analyze the data against its compression history and then to search the memory, e.g., compression history database with a function of traffic priority and LRU, e.g., Fn (Priority+LRU), for the existence of the data being requested for. Based on the traffic priority, compression history manager 330 is configured to scan the data in a particular priority set and apply LRU locally. When compression history manager 330 finds traffic priority of the data higher across different compression history set, then compression history manager 330 is configured to move the data to a new compression history set.

In some embodiments, compression history manager 330 is configured to determine evicting a pseudo proportional amount of data across each traffic priority in their respective compression history set, thereby mitigating the possibility of complete eviction of high priority data. For example, it is assumed that a memory, e.g., compression history database, is full and new data needs an eviction. There can be five traffic priority levels, e.g., P1-P5 with P1 being the highest priority and P5 being the lowest priority. Some data can be classified as P1 and other data can be classified as P2, P3, P4 and P5. Compression history manager 330 can determine evicting 5 units of P5, 4 units of P4, 3 units of P3, 2 units of P2 and 1 units of P1 in a round robin fashion. The unit can be in bytes or in any other standard size. Compression history manager 330 can evict a pseudo proportional amount of data across each traffic priority in the compression history set and the other compression history set.

Thus, compression history manager 330 can evict in a round robin fashion by prioritizing high priority traffic. Assuming that there is a new connection whose data needs to be stored in a memory, e.g., compression history database, and it needs 45 bytes of space, compression history manager 330 can evict 15 bytes data having P5 class, 12 bytes data having P4 class, 9 bytes data having P3 class, 6 bytes data having P2 class, and 3 bytes data having P1 class in a round robin fashion, for example. This eviction can free up 45 bytes of space that can be used for storing the new incoming connection data. While with older implementations there is a possibility that higher priority connection data can be evicted completely to accommodate for the 45 bytes of new data, the embodiments disclosed herein only evicts 3 bytes of the highest priority data. Instead of evicting one set of data, the embodiments can also pseudoproportionally evict across multiple traffic priorities and hence provides better optimized data benefits. In some other embodiments, compression history manager 330 is configured to provide determination of eviction to TCP controller 320.

QoS engine 310 can be configured to monitor any incoming connection requests. QoS engine 310 can be configured to analyze data over each connection to see traffic priority information of the data conveyed over each connection. For example, there can be five traffic priority levels, e.g., P1-P5 with P1 being the highest priority and P5 being the lowest priority. Some data can be classified as P1 and another data can be classified as P5. At 440, QoS engine 310 can provide compression history manager 330 with the traffic priority information of the data conveyed over each connection.

In some aspects, TCP controller 320 is configured to acquire a determination of eviction. For example, the determination of eviction can be specific data, its traffic priority, and data size to be evicted, such as eviction of 15 bytes data having P5 class, 12 bytes data having P4 class, 9 bytes data having P3 class, 6 bytes data having P2 class, and 3 bytes data having P1 class. Based on the determination of eviction, TCP controller 320 can evict data in determined bytes and rearrange remaining data currently queued in a cache queue $Q_L$ 430. According to some embodiments, TCP controller 320 can process TCP data flow in the cache queue $Q_L$ 430 and route the data flow to its destination.

Figure 5:
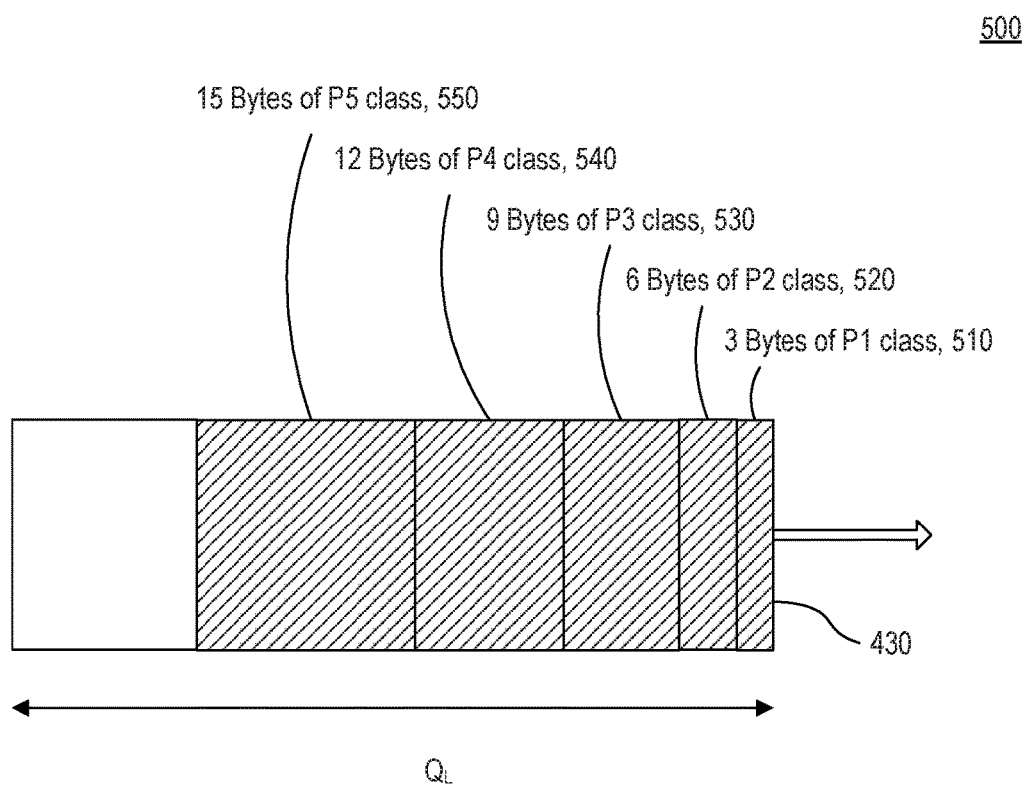
FIG. 5 is a block diagram of an exemplary cache queue, consistent with embodiments of the present disclosure.

FIG. 5 is a block diagram of an exemplary cache queue 500, consistent with embodiments of the present disclosure. The exemplary cache queue 500 is full and includes data determined to be evicted. As exampled in FIG. 4, compression history manager 330 can determine eviction of 15 bytes data having P5 class 550, 12 bytes data having P4 class 540, 9 bytes data having P3 class 530, 6 bytes data having P2 class 520, and 3 bytes data having P1 class 510. Based on the eviction determination, total 45 bytes data is evicted across a plurality of traffic priorities.

Figure 6:
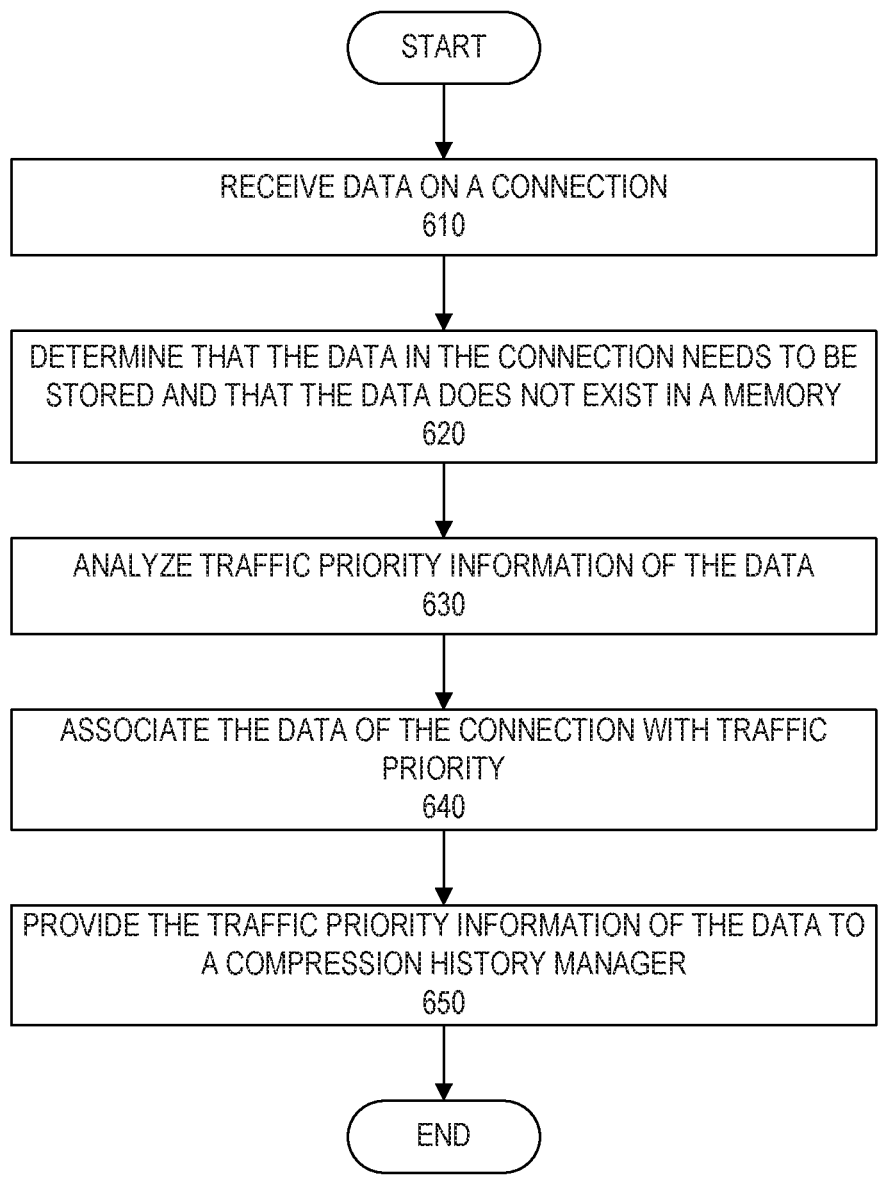
FIG. 6 is a flowchart representing an exemplary method of providing traffic priority information of data, consistent with embodiments of the present disclosure.

FIG. 6 is a flowchart representing an exemplary method 600 of providing traffic priority information of data, consistent with embodiments of the present disclosure. It will be readily appreciated that the illustrated procedure can be altered to delete steps or further include additional steps. While method 600 is described as being performed by an appliance (e.g., appliance 108), it is appreciated that method 600 can be performed by other devices alone or in combination with the appliance.

As an initial step 610, appliance 108 receives data on a connection. At step 620, appliance 108 determines that the data in the connection needs to be stored and that the data does not exist in a memory, e.g., compression history database 420. In some embodiments, appliance 108 can also determine if there is traffic priority information in a header of the data. Assuming that there is traffic priority information in the header of data packet, based on the traffic priority information of the data, appliance 108 can simply look up compression history database and check whether there is a categorized compression history set associated with the data. In this case, appliance 108 performs the step 650 without the steps 630 and 640. When there is no traffic priority information in the header of data packet, appliance 108 can look up the memory or storage to see if there is the data. As an implementation option, data can be stored locally in appliance 108 or a storage which can be wired or wirelessly connected to appliance 108.

After determining that the data in the connection needs to be stored and that the data does not exist in a memory, e.g., compression history database 420, appliance 108 analyzes traffic priority information of the data at step 630. Appliance 108 can also associate the data of the connection with traffic priority at step 640. Appliance 108 can also add traffic priority information in the header of the data. Appliance 108 provides the traffic priority information of the data to compression history manager 330 at step 650. The traffic priority information of the data facilitates appliance 108 to look up compression history database and to check whether there is a categorized compression history set associated with the data.

Figure 7:
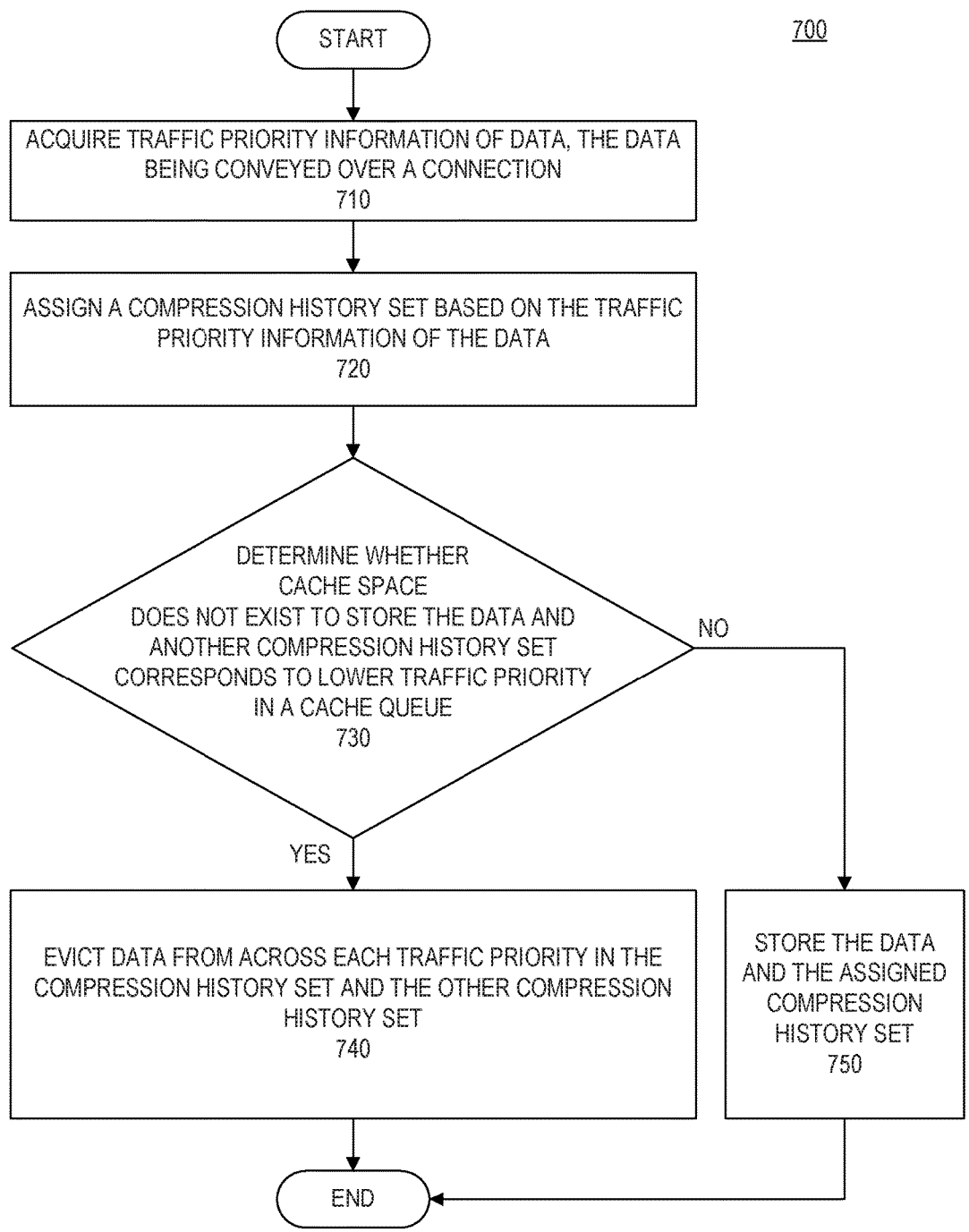
FIG. 7 is a flowchart representing an exemplary method of determining eviction of data in a compression history set based on traffic priority, consistent with embodiments of the present disclosure.

FIG. 7 is a flowchart representing an exemplary method 700 of determining eviction of data in a compression history set based on traffic priority, consistent with embodiments of the present disclosure. It will be readily appreciated that the illustrated procedure can be altered to delete steps or further include additional steps. While method 700 is described as being performed by an appliance (e.g., appliance 108), it is appreciated that method 700 can be performed by other devices alone or in combination with the appliance.

As an initial step 710, appliance 108 acquires traffic priority information of data, the data being conveyed over a connection. In exemplary embodiments, appliance 108 can inspect a header of data packet to check whether there is traffic priority information. Traffic priority can be expressed in various ways, such as high/medium/low priority levels, and priority levels in numeric or alphabetical order (e.g., priority 1 or A can be the highest priority, and priority 2 or B can be the second highest priority, etc.). When appliance 108 determines that there is no traffic priority information in the header of data packet, appliance 108 can assign traffic priority to the data packet. Appliance 108 can also add traffic priority information in the header of the data packet and store traffic priority information of the data in a compression history set.

At step 720, appliance 108 assigns a compression history set based on the traffic priority information of the data. Compression history set includes a set of information associated with the data including but not limited to: which connection the data has been connected, the data itself, a pointer that is directed to a stored location of the data, traffic priority information of the data, and so on. Categorized compression history set indicates a level of traffic priority information of data. For example, assuming that there are three compression history sets, compression history set-A can represent information of high priority data, compression history set-B can represent information of medium priority data, and compression history set-C can represent information of low priority data. As an implementation option, each compression history set can be mapped to each traffic priority level when there are same numbers of compression history sets and traffic priority levels. Alternatively, compression history set can be mapped to one or more traffic priority levels when there are more traffic priority levels than the number of compression history sets. For example, when assuming that there are three compression history sets and five traffic priority levels, e.g., P1 the highest and P5 the lowest priority level in numerical order, compression history set A can be assigned to accommodate data having P1 level, compression history set B can be assigned to accommodate data having P2 and P3 levels, and compression history set C can be assigned to accommodate data having P4 and P5 levels. In this example, compression history set A represents the highest importance because it contains information of data with the highest priority level (P1), compression history set B represents medium importance because it contains information of data with the next highest priority levels (P2 and P3), and compression history set C represents low importance because it contains information of data with low priority levels (P4 and P5).

Appliance 108 determines whether cache space does not exist to store the data and another compression history set corresponds to lower traffic priority in a cache queue at step 730. In some embodiments, appliance 108 can look up compression history database and check whether there is a categorized compression history set, in order to determine whether the other compression history set corresponds to lower traffic priority in a cache queue. Because compression history set C represents low importance because it contains information of data with low priority levels (P4 and P5) in the above-example, appliance 108 can check if there is compression history set C first. Appliance 108 can check compression history set B in an order if there is no compression history set C, and then compression history set A if there is no compression history set B. By simply checking a categorized compression history set in an order, appliance 108 can expedite searching time of data without necessarily inspecting all the data stored in compression history database.

When determining that cache space does not exist to store the data and another compression history set corresponds to lower traffic priority in a cache queue, appliance 108 evicts data from the other compression history set corresponding to lower traffic priority at step 740. After appliance 108 determines that there is compression history set C which represents low importance because it contains information of data with low priority levels (P4 and P5) in the above-example, appliance 108 can determine and evict the data with low priority levels. In some embodiments, there can be a plurality of low priority levels (e.g., P4 and P5) in a compression history set (e.g., compression history set C). In this case, appliance can further determine and evict the data with the lowest priority level (e.g., P5) first and then the next lowest priority level (e.g., P4).

When determining that cache space exists to store the data in the cache queue, appliance 108 stores the data and the assigned compression history set in a memory at step 750. Appliance 108 can also store other information associated with the data, such as data size, time period that data has been stored, time out of data retention, and so on.

Figure 8:
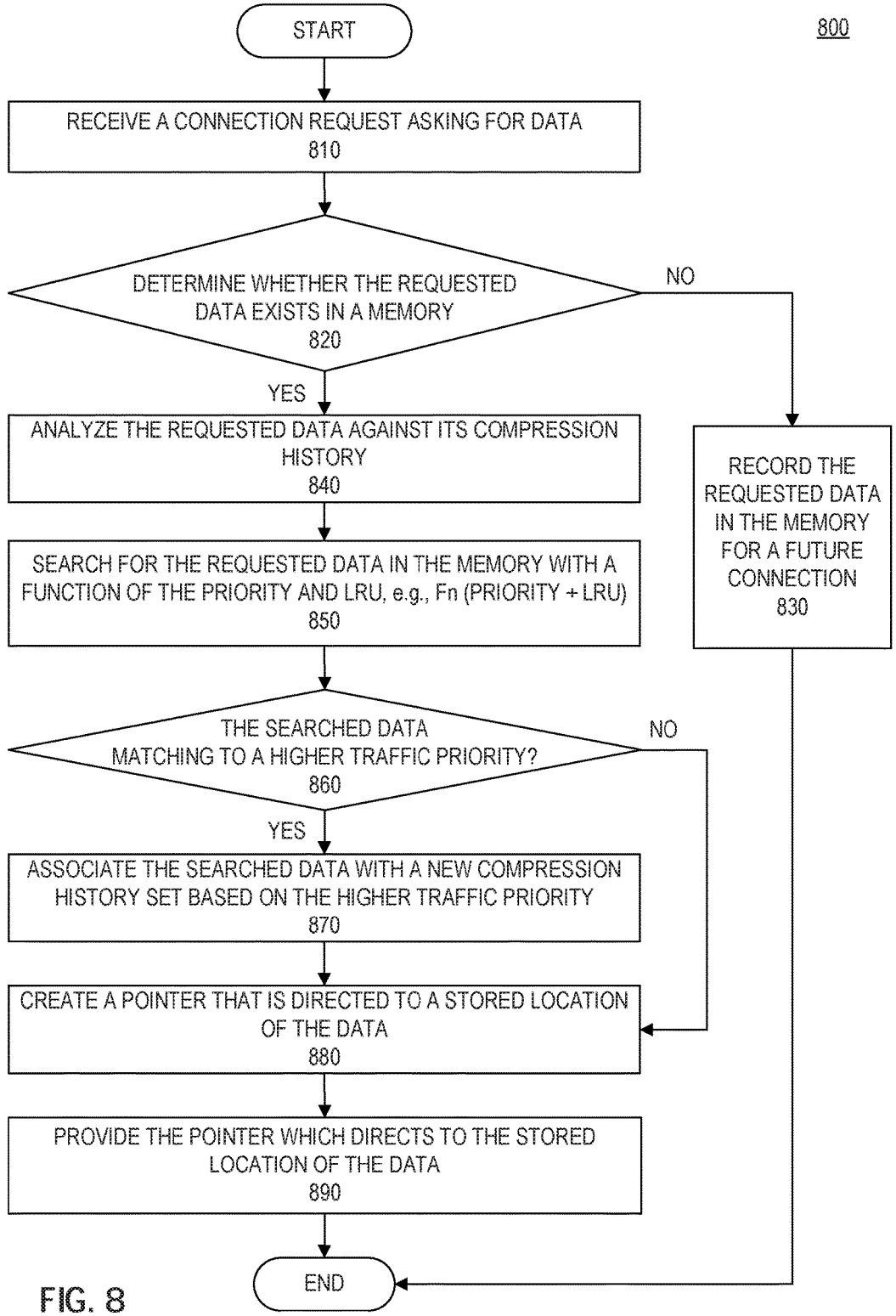
FIG. 8 is a flowchart representing an exemplary method of providing requested data, consistent with embodiments of the present disclosure.

FIG. 8 is a flowchart representing an exemplary method 800 of providing requested data, consistent with embodiments of the present disclosure. It will be readily appreciated that the illustrated procedure can be altered to delete steps or further include additional steps. While method 800 is described as being performed by an appliance (e.g., appliance 108), it is appreciated that method 800 can be performed by other devices alone or in combination with the appliance.

As an initial step 810, appliance 108 receives a connection request asking for data. The connection request can include information that aids to find out the data in a memory. The information that aids to find out the data can include but not be limited to at least one of file name, file size, sequence number of the data; a pointer that is directed to a stored location of the data or a link to a storage server location, one or more key words of the data, etc.

Appliance 108 determines whether the requested data exists in a memory, e.g., compression history database 420 at step 820. In order to determine whether the requested data exists in a memory, e.g., compression history database 420, appliance 108 can look up the memory, e.g., compression history database 420. When looking up the memory, appliance 108 can use the information of the data in the connection request.

After determining that the requested data does not exist in the memory, e.g., compression history database 420, appliance 108 records the requested data in the memory for a future connection at step 830. Appliance 108 can also record the information of the data in the connection request. The information of the data in the connection request that aids to find out the requested data in the memory can include but not be limited to at least one of file name, file size, sequence number of the data; a pointer that is directed to a stored location of the data or a link to a storage server location, one or more key words of the data, etc.

After determining that the requested data exists in the memory, e.g., compression history database 420, appliance 108 analyzes the requested data against its compression history at step 840. Appliance 108 can also identify traffic priority of the requested data against its compression history. A corresponding compression history set associated with the data includes but is not limited to at least one of traffic priority information of the data conveyed over certain connection and a pointer that is directed to a stored location of the data.

Appliance 108 searches for the requested data in the memory with a function of traffic priority information of the data and LRU information, e.g., Fn (PRIORITY+LRU) at step 850. In some embodiments, appliance 108 scans the data in particular priority set based on the traffic priority information and then applies LRU. Although LRU can be applied locally within appliance 108, it would be appreciated that LRU can also be applied externally in an external storage depending on where the memory (e.g., compression history database) is located.

After applying LRU, the corresponding compression history set associated with the data can be changed. The corresponding compression history set can be upgraded to a higher level of compression history set. This means that the searched data with a function of traffic priority information of the data and LRU information, e.g., Fn (PRIORITY+LRU) is matched to a higher traffic priority. This is related to the step 860 at which appliance 108 determines that the searched data matches to a higher traffic priority.

After determining that the searched data matches to a higher traffic priority, appliance 108 associates the searched data with a new compression history set based on the higher traffic priority at step 870. For example, the requested data can have traffic priority level (e.g., P2) and there can be a plurality of data, each data having a different traffic priority level, in a cache queue when receiving a connection request asking for data. Based on the search with a function of traffic priority information of the data and LRU information, e.g., Fn (PRIORITY+LRU), the traffic priority of the requested data can be upgraded to a higher traffic priority (e.g., P1) subject to the status of the cache queue. In the status of the cache queue, there can be a plurality of data, each data having lower traffic priority level (e.g., P3, P4, or P5) than the traffic priority of the requested data, for instance. Then, appliance 108 can preempt higher priority connection for the searched data than the plurality of the data in the cache queue.

After determining that the searched data does not match to a higher traffic priority at step 860 or associating the searched data with a new compression history set based on the higher traffic priority at step 870, appliance 108 creates a pointer that is directed to a stored location of the data at step 880. At step 890, appliance 108 provides the pointer to the connection request received at step 810. By providing the pointer directing to a stored location of the data rather than transmitting the data itself, the size of a message in response to the connection request asking for data can be significantly decreased.

Figure 9:
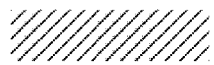
FIG. 9 is a block diagram of an exemplary compression history database, consistent with embodiments of the present disclosure.

FIG. 9 is a block diagram of an exemplary compression history database 900, consistent with embodiments of the present disclosure. Compression history database 900 comprises information for one or more connections 910, data 920, traffic priority of the data 930, and compression history 940. Compression history database 900 can also comprise a pointer that is directed to a stored location of each data (not shown in FIG. 9). It is appreciated that other information can also be stored in the compression history database 900.

According to some embodiments, a plurality of data (e.g., D-1 921, D-2 922, and D-3 923) can be conveyed over a connection (e.g., C1 911). Appliance 108 can analyze traffic priority information of each data (e.g., P1 931, P1 932, and P2 933) and assign a compression history set based on the traffic priority information of the data (e.g., compression history set-A 941, and compression history set-B 942).

In some embodiments, compression history set (e.g., 941 or 942) includes a set of information associated with the data including but not limited to at least one of: which connection the data has been connected, the data itself, a pointer that is directed to a stored location of the data, traffic priority information of the data, and so on. Categorized compression history set indicates a level of traffic priority information of data that makes appliance 108 determine easier and faster to look up which compression history set first and determine to evict which data and what size of the data. For example, compression history set-A 941 can represent higher importance because it contains information of data with a higher priority level, while compression history set-B 942 can represent lower importance because it contains information of data with a lower priority level.

After receiving a new connection C2 912 including data D-4 924, appliance 108 determines that the data D-4 924 is part of a compression history 940, analyzes traffic priority information P3 934 of the data D-4 924, and determines which compression history set the data belongs to based on the traffic priority information P3 934 of the data D-4 924. Appliance 108 determines that traffic priority P3 934 of the data D-4 924 is lower than traffic priorities P1 931 and P2 933 in compression history 940. So, appliance 108 checks at least one compression history set in a memory from lowest priority importance set, e.g., compression history set-B 942 and then compression history set-A 941. Because traffic priority P3 934 of the data D-4 924 is lower than traffic priorities P1 931 and P2 933 in compression history set-A 941 and compression history set-B 942, respectively, appliance 108 associates the data D-4 924 with compression history set-C 943.

When receiving another new connection C3 913 including data D-5 925, appliance 108 determines that the data D-5 925 is not part of a compression history 940, analyzes traffic priority information P1 935 of the data D-5 935. Then, appliance 108 determines that the traffic priority information P1 is associated with compression history set-A, so appliance 108 associates the data D-5 935 with compression history set-A 944 based on the traffic priority information P1 935 of the data D-5 925.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance for evicting data based on traffic priority of data, the appliance comprising:
   at least one memory and at least one processor cooperating therewith to:
   acquire traffic priority information of data being conveyed over a connection, with the traffic priority including N priority levels, with N>2;
   assign a compression history set based on the traffic priority information of the data; and
   if cache space does not exist to store the data and another compression history set corresponds to a lower traffic priority in a cache queue, evict a pseudo proportional amount of data across each traffic priority in the compression history set and the other compression history set, with the pseudo proportional amount of data being evicted corresponding to 1 unit of bytes for a highest priority level, N units of bytes for a lowest priority level, and 2 to N−1 units of bytes for incrementally decreasing priority levels between the highest and lowest priority levels.

2. The appliance of claim 1, the appliance further comprises a QoS engine configured to:
   analyze the traffic priority information of the data;
   associate the data of the connection with a traffic priority; and
   provide the traffic priority information of the data to the at least one processor.

3. The appliance of claim 1, wherein the at least one processor is further configured to store, in the at least one memory, the compression history set based on the traffic priority information of the data.

4. The appliance of claim 1, wherein the at least one processor is further configured to create a pointer that is directed to a stored location of the data.

5. The appliance of claim 1, wherein the at least one processor is further configured to:
   receive a connection request asking for the data;
   determine if the requested data exists in the at least one memory; and
   provide the data or a pointer that is directed to a stored location of the data, based on determination that the data exists in the at least one memory.

6. The appliance of claim 5, wherein the determination of existence of the requested data in the at least one memory further comprises analysis of the requested data against a corresponding compression history set associated with the traffic priority information of the data.

7. The appliance of claim 5, wherein the at least one processor is further configured to search the at least one memory with a function of the traffic priority information of the data and least recently used (LRU) information.

8. The appliance of claim 1, wherein the at least one processor is further configured to, if cache space exists to store the data, store the data and the assigned compression history set.

9. A method of evicting data based on traffic priority of data, the method comprising:
   acquiring traffic priority information of data being conveyed over a connection, with the traffic priority including N priority levels, with N>2;
   assigning a compression history set based on the traffic priority information of the data;
   determining that cache space does not exist to store the data and another compression history set corresponds to a lower traffic priority in a cache queue; and
   evicting a pseudo proportional amount of data across each traffic priority in the compression history set and the other compression history set, with the pseudo proportional amount of data being evicted corresponding to 1 unit of bytes for a highest priority level, N units of bytes for a lowest priority level, and 2 to N−1 units of bytes for incrementally decreasing priority levels between the highest and lowest priority levels.

10. The method of claim 9, further comprising:
    analyzing the traffic priority information of the data;
    associating the data of the connection with a traffic priority; and
    providing the traffic priority information of the data to a compression history manager.

11. The method of claim 9, further comprising storing, in a memory, the compression history set based on the traffic priority information of the data.

12. The method of claim 9, further comprising creating a pointer that is directed to a stored location of the data.

13. The method of claim 9, further comprising:
    receiving a connection request asking for the data;
    determining if the requested data exists in a memory; and
    providing the data or a pointer that is directed to a stored location of the data, based on determination that the data exists in the memory.

14. The method of claim 13, wherein determining if the requested data exists in the memory further comprises analyzing the requested data against a corresponding compression history set associated with the traffic priority information of the data.

15. The method of claim 13, further comprising searching the memory with a function of the traffic priority information of the data and least recently used (LRU) information.

16. The method of claim 9, further comprising, if cache space exists to store the data, storing the data and the assigned compression history set.

17. A non-transitory computer readable storage medium that stores a set of instructions that are executable by at least one processor of an appliance to cause the appliance to perform a method of evicting data based on traffic priority of data, the method comprising:

acquiring traffic priority information of data being conveyed over a connection, with the traffic priority including N priority levels, with N>2;

assigning a compression history set based on the traffic priority information of the data; and if cache space does not exist to store the data and another compression history set corresponds to a lower traffic priority in a cache queue, evicting a pseudo proportional amount of data across each traffic priority in the compression history set and the other compression history set, with the pseudo proportional amount of data being evicted corresponding to 1 unit of bytes for a highest priority level, N units of bytes for a lowest priority level, and 2 to N−1 units of bytes for incrementally decreasing priority levels between the highest and lowest priority levels.

18. The non-transitory computer readable storage medium of claim 17, the method further comprising:

analyzing the traffic priority information of the data;

associating the data of the connection with a traffic priority; and providing the traffic priority information of the data to a compression history manager.

19. The non-transitory computer readable storage medium of claim 17, the method further comprising storing, in a memory, the compression history set based on the traffic priority information of the data.

20. The non-transitory computer readable storage medium of claim 17, the method further comprising creating a pointer that is directed to a stored location of the data.

21. The non-transitory computer readable storage medium of claim 17, the method further comprising:

receiving a connection request asking for the data;

determining if the requested data exists in a memory; and providing the data or a pointer that is directed to a stored location of the data, based on determination that the data exists in the memory.

22. The non-transitory computer readable storage medium of claim 21, wherein determining if the requested data exists in the memory further comprises analyzing the requested data against a corresponding compression history set associated with the traffic priority information of the data.

23. The non-transitory computer readable storage medium of claim 21, the method further comprising searching the memory with a function of the traffic priority information of the data and least recently used (LRU) information.

24. The non-transitory computer readable storage medium of claim 17, the method further comprising, if cache space exists to store the data, storing the data and the assigned compression history set.

* * * * *